…

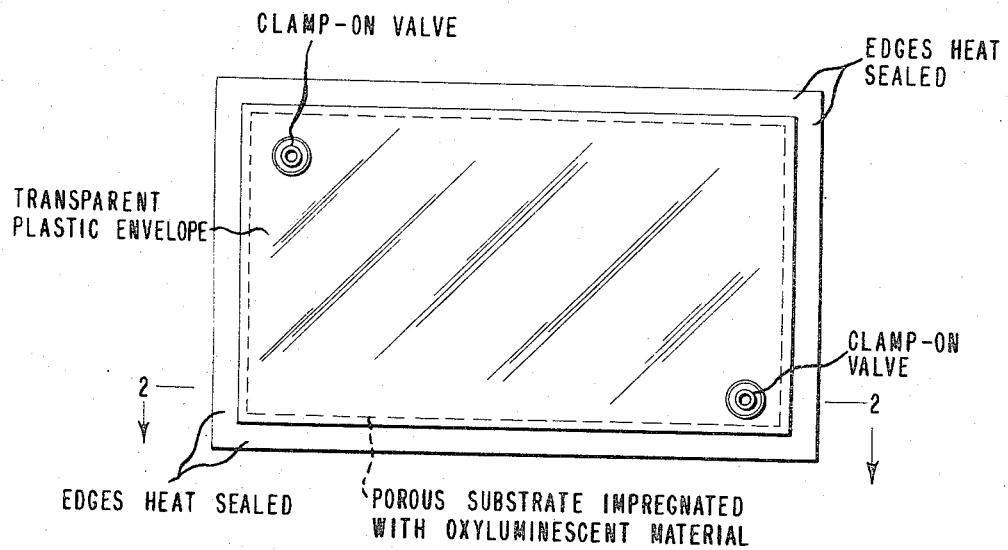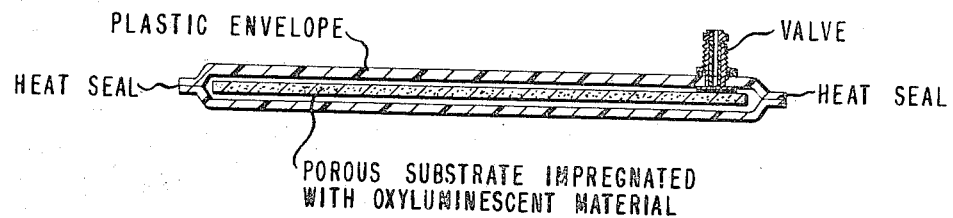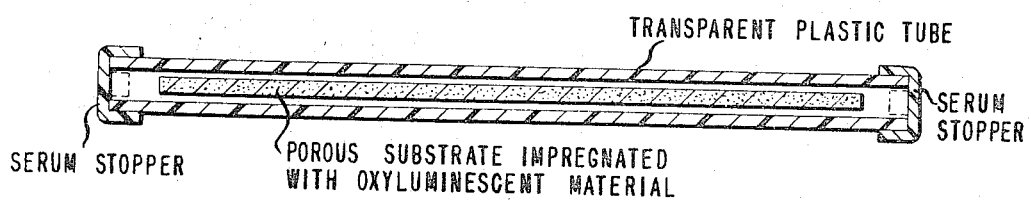

United States Patent Office 3,350,553
Patented Oct. 31, 1967

3,350,553
OXYLUMINESCENT LIGHT SOURCES AND
PROCESSES OF MAKING SAME
Edward T. Cline, Wilmington, Del., assignor to E. I. du Pont de Nemours and Company, Wilmington, Del., a corporation of Delaware
Continuation of application Ser. No. 463,398, June 11, 1965. This application Aug. 5, 1965, Ser. No. 477,614
18 Claims. (Cl. 240—2.25)

This application is a continuation of my copending application, Ser. No. 463,398, filed June 11, 1965, itself a continuation-in-part of my copending application Ser. No. 397,038, filed Sept. 16, 1964, both now abandoned.

This invention relates to extended light sources as opposed to point sources. More particularly, it relates to such light sources based on oxyluminescent materials.

Extended light sources are useful in various applications, e.g., in facilitating rescue operations for isolated groups on land, for downed aircraft and personnel at sea or for personnel overboard at sea.

A novel and useful extended light source is provided by the present invention. This invention is an oxyluminescent article comprising a sheet-like or rope-like porous substrate impregnated with a tetrakis(disubstituted-amino) ethylene oxyluminescent material enclosed in a flexible plastic envelope or tube, at least one portion of which, generally one whole side of the envelope or the whole tube, is translucent and preferably transparent, and the assembly being fitted with at least one means for admitting air, e.g., a valve, port, tear strip, puncturable section, or the like, to the oxyluminescent material in controlled amounts when desired.

The invention will be understood in more detail from the remainder of this specification and from the essentially self-explanatory drawings in which:

FIG. 1 discloses a view of a transparent panel serving as an extended light source of the invention in which two rectangular sheets of transparent plastic material are heat-sealed at the edges and provided with valves to form a transparent envelope surrounding a spacer comprising a porous substrate impregnated with oxyluminescent material to which air can be admitted through the valves;

FIG. 2 represents a section along line 2—2 of FIG. 1 showing the porous substrate; and FIG. 3 represents a section of an alternative embodiment of the invention (see, e.g., Example XVI below) in which a porous substrate impregnated with oxyluminescent material is inserted within a transparent plastic tube and the ends of the tube are sealed off with hypodermic-puncturable serum stoppers.

Preferably (1) the enclosing envelope or tube is constructed of a tough plastic which has low oxygen permeability and high resistance to the oxyluminescent material and its oxidation products, (2) the porous substrate, if not rough or uneven, is provided with a course, open-mesh, net-like structure to prevent intimate contact with the enclosing envelope or tube, (3) the side of the envelope opposite the translucent or transparent side being provided with a light-reflective layer, e.g., an aluminum coating or foil, or the tube being provided with a light reflector which may be flat or hemicylindrical or of parabolic cross section, (4) the oxyluminescent material in the porous substrate is a tetrakis(disubstituted-amino)-ethylene of the formula

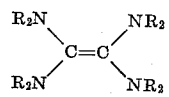

wherein the R's are the same or different and are monovalent alkyl or cycloalkyl of up to 10 carbon atoms, divalent alkylene joined to the other R attached to the same nitrogen to form a 3–5 membered monoaza heterocycle, and divalent alkylene joined to an R attached to a second nitrogen to form a 3–7 membered diaza heterocycle, and (5) the oxyluminescent material is in an inert liquid or semisolid carrier.

The oxyluminescent articles of this invention have varying degrees of shelf stability, depending on the oxygen permeability of the particular envelope or tube employed. Thus, articles prepared with enclosures of low oxygen permeability, e.g., enclosures of polyvinyl fluoride, retain their ability to luminesce when air is admitted after storage for periods of up to four months or more in air at normal room temperatures. Articles can be stored for even longer times if they are protected even more carefully from the ingress of oxygen or air, e.g., by storing them in an inert atmosphere, e.g., an atmosphere of nitrogen, in a closed metal or glass container. When enclosures of higher oxygen permeability are employed, e.g., envelopes or tubes made of polyethylene of 2–4 mils thickness, the slow permeability of oxygen through this material causes the oxyluminescent material in the porous substrate to luminesce quite strongly for a period of a few hours, due to oxygen penetrating the enclosing plastic. The luminescence then gradually decreases to a very feeble glow at the end of several days. When articles constructed with enclosures of low oxygen permeability are activated by admitting air to the inner impregnated layer, they give very good luminescence for relatively long periods of time. Thus, panels of this type 2–4 feet square are visible under clear weather conditions for distances of 2–4 miles. Even relatively small tubes one foot long x ¼" diameter can be seen from distances of 75 feet or more.

The oxyluminescent articles of this invention can be prepared in a variety of ways. In these various methods, a critical factor is that the impregnation of the porous substrate with the oxyluminescent material must be carried out under as oxygen-free conditions as possible.

A convenient method of preparing panel-type articles comprises placing a sheet or layer of a porous substrate that is inert to the oxyluminescent material between two sheets of flexible plastic, at least one of which permits passage of light through it, i.e., is translucent or transparent, of a size slightly larger than the porous substrate. Prior to sealing the plastic sheets, an opening is made near the edge of one of them and a valve, port, or other means for permitting access to the inner portion of the panel is inserted. The edges of the outer plastic sheets then are sealed, for example, by heating, if the plastic layers are capable of being heat sealed or by the use of an adhesive if they are not heat sealable.

A convenient method for preparing tubular articles of this invention comprises passing a string or cord through a length of plastic tubing, e.g., by means of a jet of compressed air or nitrogen, then attaching one end of the cord to the end of a narrow strip, rope, multiple strands or sleeving of porous substrate and pulling the substrate into the tubing. As in the case of panels, the porous substrate is inert to the oxyluminescent material with which it is to be impregnated. The porous substrate must have a cross sectional area such that it does not completely fill the plastic tube in order that air can circulate through the tube when light is desired. The tubular article also is provided with a valve, port, or other means for permitting access to the inner portion of the tube.

The valve or port enables the removal of air from the panel or tube by successive evacuation and flushing the interior with an inert gas, e.g., nitrogen. The successive evacuation and flushing steps are repeated as many times as necessary to insure substantially complete removal of air from the interior of the enclosure. The oxyluminescent material, i.e., the tetrakis(disubstituted-amino)ethylene, preferably dissolved in an inert solvent, e.g., mineral oil, paraffin wax or polyisobutylene, is introduced through the valve or port and the valve is then closed, or a sealing strip is placed over the opening.

Alternatively, the outer plastic enclosures can be cut too long in one dimension. After the original sealing, the flushing and filling can be performed by inserting hypodermic needles in the excess length. Finally, another seal can be made inside the needle hole areas and the excess length trimmed off.

In preparing the oxyluminescent panels, it is preferable to insert between the porous substrate and the transparent face of the envelope (or between the porous substrate and both sides of the envelope if desired) a coarse, open-mesh or net-like structure, e.g., nylon netting, as a spacer. The spacer prevents the porous substrate when wet with oxyluminescent material from adhering to the outer plastic film. This permits air to circulate more uniformly between the substrate and the outer plastic layers, with the result that when air is admitted to start the luminescence of the panel, a more uniform and intense light emission occurs.

A spacer can also be placed between the porous substrate and the walls of the flexible plastic tube to allow air to circulate more readily between the substrate and the walls of the tube. However, in the case of tubular light sources, the spacer is not as important as in the case of large panels.

The plastic envelope surrounding the porous substrate can be made of sheets of a single plastic or it can be made of sheets of a plastic having a coating of the same or different polymer to provide lower oxygen permeability, or to impart heat sealability or other property to the film. Furthermore, the enclosing envelope can be made of a composite sheet of plastic consisting of two or more coated or uncoated plastic films laminated together. The upper and lower outer layers of the envelope can be made of the same or different plastic films. However, all components of a laminated structure on at least one side of the porous substrate must be transparent or translucent. Similarly, the tubular articles of this invention can be made of plastic tubes having a coating, either inside or outside, or both, of the same or different polymer to provide the same desired properties as in the case of panels.

A preferred embodiment of the articles of this invention comprises the use of a transparent plastic outer layer on both sides of the porous substrate with a thin layer of light-reflective material, e.g., aluminum foil, cemented to the outside of the bottom layer of the envelope or tube. Alternatively, aluminum or other metal can be vacuum deposited on the outside of the lower plastic sheet and protected by a coating or another plastic. Tubes can be provided with external, flat, or shaped light reflectors as discussed above. The use of such a light-reflective layer produces a surprising increase in the amount of light visible from the transparent side of the article. The results obtained in a typical case are given in Example IX.

Other embodiments of the panels of this invention include the use of a pressure-sensitive, or tacky, adhesive on the back of the panel or on one side of the tube to facilitate its attachment to any desired object or surface. Alternatively, snaps can be affixed to the panels or tubes to permit attachment to another object.

The oxyluminescent materials particularly useful in the articles of this invention include the tetrakis(disubstituted-amino)ethylenes of the formula

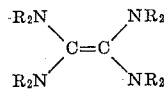

wherein the Rs have the meanings defined hereinbefore. Specific oxyluminescent compounds of this type include tetrakis(dimethylamino)ethylene, tetrakis(N - pyrrolidinyl)ethylene, 1,1',3,3' - tetramethyl-$\Delta^{2,2'}$-bi(imidazolidine), 1,1',3,3' - tetraethyl-$\Delta^{2,2'}$ - bi(imidazolidine), 1,1'-diethyl- 3,3'-dimethyl - $\Delta^{2,2'}$ - bi(imidazolidine), 1,1',3,3' - tetramethyl - $\Delta^{2,2'}$ - bi(hexahydropyrimidine), and tetrakis(dimethylaminomethyleneamino)ethylene.

The tetrakis(dimethylamino)ethylene can be prepared by reaction of dimethylamine with chlorotrifluoroethylene as described in J. Am. Chem. Soc. 72, 3646 (1950). The other tetrakis(disubstituted-amino)ethylenes of the above general formula and the bis(disubstituted-amino) hydrocarbyloxymethanes intermediate thereto can be prepared by reaction of the requisite basic secondary amine and any amide acetal, i.e., any disubstituted-aminodihydrocarbyloxymethane in accord with the following stoichiometry:

1.
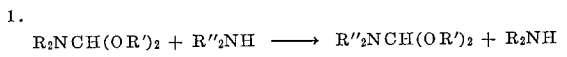

2.

3.
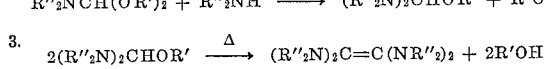

wherein the Rs, which can be alike or different, are monovalent alkyl or cycloalkyl radicals, generally of no more than eight carbons each, which can be together joined (in a divalent radical) to form with the intervening nitrogen a heterocycle of from three to seven ring members; the R's, which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R''s, which can also be alike or different or together joined, are monovalent (or divalent) alkyl or cycloalkyl hydrocarbon or oxa- and/or azahydrocarbon radicals of no more than eight carbons each, each nitrogen carrying no more than one methyl group and, in the case of the divalent radicals, no more than 6 carbons per divalent radical. In any event, when the two R''s are together joined, they form with the indicated amine nitrogen a monoazacarbocycle, an oxaazacarbocycle, or a diazacarbocycle of from three to seven ring members. This process is described in greater detail in U.S. Pat. 3,239,519.

As indicated previously, the oxyluminescent materials used in the panels of this invention are conveniently used with an inert, nonquenching solvent or carrier, i.e., a material which does not extinguish the oxyluminescence of the tetrakis(disubstituted-amino)ethylene. Suitable solvents of this type include the hydrocarbons such as n-hexane, decane, decalin, triisobutylene, cetane, tetra-isobutylene, n-octadecane, 1-octadecene, purified kerosenes, white gasolines, or the more viscous hydrocarbons such as mineral oil and the like, or solid or semisolid hydrocarbons such as paraffin wax; nonquenching synthetic oils such as silicone oils, polyalkylene glycols, and diesters; nonquenching, preferably essentially hydrocarbon esters such as ethyl acetate; nonquenching hydrocarbon ethers such as tetrahydrofuran, diethyl ether, dimethyl ether, and the like.

The oxyluminescent compositions can also include compatible nonquenching, organic or inorganic, thickening agents. Examples of suitable nonquenching thickening agents include nonreducible, noncoordinating inorganic oxides, preferably in colloidal dispersion, such as silica, alumina, zinc oxide, and the like; organic nonquenching polymers such as the hydrocarbon polymers, e.g., polyisobutylene, polypropylene, polyethylene, and the like; nonquenching polyesters, e.g., polyvinyl acetate and the like; nonquenching polyethers such as polytetramethylene oxide and the like; nonquenching olefin/ester copolymers such as ethylene/vinyl acetate copolymers and the like.

A wide variety of porous substrates can be used in the articles of this invention for absorbing the oxyluminescent material. Among those that are useful are foamed or otherwise cellular sheets, ribbons, strands or types of polymers such as polystyrene, polyurethanes, poly(vinyl chloride), polyethylene, and polyacrylonitrile; glass fiber fabric (both woven and nonwoven); cellulosic paper such as bleached kraft paper or sulfite paper; fabrics (both woven and nonwoven) of such fibers as poly(ethylene terephthalate) fiber, rayon, cotton, nylon and acrylic fibers; mats or fabrics made of porous poly(vinylidene chloride) fibers and vinyl chloride copolymers; sheets made of opaque, foamed plastic fibers; sheets of alkali cellulose; nonwoven sheets of polyethylene or polypropylene fibers; and glass fiber sheets, paper, and mats.

The flexible plastic envelopes of the panels and the plastic tubes can also be made of a wide variety of polymeric materials. For example, the plastic layer surrounding the oxyluminescent impregnated porous substrate can be made of polyolefins, e.g., polyethylene; fluorinated polymers; polyacrylonitrile; polyesters, e.g., poly(ethylene terephthalate); polyamides; polyvinyl alcohol; poly(vinyl fluoride); poly(vinyl chloride); cellulosic films; laminations of two or more sheets of different polymers, e.g., polyethylene and poly(ethylene terephthalate) films; and the like. The plastic envelopes and tubes can also be coated with coating compounds, such as poly(vinylidene chloride), to impart certain desired properties to the envelope, e.g., low oxygen permeability, heat sealability, or an adhesive surface.

As indicated above, spacers positioned between the porous substrate and the enclosing envelope or tube provide more uniform and more intense light emission from the oxyluminescent layer. These spacers can be made of any inert, nonquenching material that can be fabricated in an open-mesh or net-like structure. Examples of specific spacers that are satisfactory include polyethylene netting, polypropylene netting, cheesecloth, nylon scrim, nylon netting, loosely woven glass fiber fabric, and the like. No spacer is needed with porous substrates that have a rough or uneven surface that permits good air circulation.

The oxyluminescent articles of this invention are illustrated in further detail in the following examples.

*Example I*

Sheets of the following porous materials are sealed in polyethylene pouches and alternately flushed with nitrogen and evacuated several times:

(1) Foamed polystyrene
(2) Foamed polyurethane
(3) Glass fiber filter mat

Into each pouch there is then introduced by hypodermic needle 480 ml. per square foot of porous sheet of a 50% by volume solution of tetrakis(dimethylamino)ethylene in mineral oil. The panels thus prepared luminesce briefly by interaction with small amounts of oxygen still present. The polyurethane foam panel is yellower than the others. After three days' storage in air at room temperature, no light emission is observed in a partly darkened room, but there is a liquid layer, at least part of which is exudate, on the outside of each panel. When a small amount of air is pumped into the panels, all three luminesce and the one with polyurethane foam is yellower, as before. After four days' further storage in air at room temperature, much more liquid has collected on the outside of the panels, at least part of the liquid being exudate. When air is pumped in, the panel containing the glass fiber mat glows very strongly, the one containing the polyurethane foam glows moderately, and the one with polystyrene foam luminesces faintly.

*Example II*

A panel is prepared using a piece of unsized bleached kraft paper about 1/32 inch thick as the absorbent porous layer. The porous layer is placed between sheets of poly(ethylene terephthalate) film which are then sealed at the edges with a polyurethane cement. The panel is evacuated and flushed with nitrogen through a hypodermic needle and there is added 22 ml. of tetrakis(dimethylamino)ethylene per square foot of the kraft paper by means of a hypodermic needle. After removal of the needle, the hole remaining in the outer envelope is sealed with tape. After 20 days' storage in air at room temperature, the tape is removed from the hole left by the hypodermic needle and light emission from the oxyluminescent layer is observed. However, the light emission is patchy and nonuniform because the film in some areas clings to the wet substrate and prevents uniform contact of air with the oxyluminescent material.

*Example III*

Panels are prepared as described in the preceding example except that the porous substrate in one panel is 1.5 g. of a poly(ethylene terephthalate) fiber nonwoven mat containing about 10% of a polymeric binder and in a second panel is 2.2 of a semidull poly(ethylene terephthalate) fiber fabric. In both cases, the outer envelope is a composite consisting of polyethylene film laminated with poly(ethylene terephthalate) film. The polyethylene layer is placed toward the inside of the envelope to permit heat sealing. The edges of the panels are heat sealed and then both panels are evacuated and flushed with nitrogen. There are than added to the panels 4.4 and 4.0 ml., respectively, of tetrakis(dimethylamino)ethylene by a hypodermic needle. The holes left by the needle are sealed by tape. After 2 weeks' storage in air at room temperature, the polyethylene layers in both panels are swollen and the laminations are separated. However, the panels still remain sealed. After storage for six months in air at room temperature, the panel having the nonwoven polyester mat displays good light emission when air is admitted.

*Example IV*

A panel is prepared as described in Example II except that the porous substrate is a glass fiber mat having a polyester binder. The outer envelope is a laminate of polyethylene and poly(ethylene terephthalate) with the edges sealed by heat. The panel is stored for five months in air at room temperature and then air is admitted, whereupon the panel emits light.

*Example V*

A panel is prepared as described in Example II with the exception that the porous substrate is 2.3 g. of a glass fiber mat about 4–5 inches square. The mat is enclosed in a pouch of polyethylene film 3.5 mils thick. The panel glows quite strongly after approximately 2.3 ml. of tetrakis(dimethylamino)ethylene is added. At the end of two hours, a low-to-medium glow is readily visible in a partly darkened room. After nine hours, the panel can be seen easily outside after dark at a distance of 75 feet, even with a lighted home nearby. The light emission is maintained by air diffusing through the polyethylene envelope. The panel continues to glow for at least three days, although the glow is quite feeble by the third day. The panel becomes oily on the outside as tetrakis(dimethylamino)ethylene and/or its oxidation products diffuse through the polyethylene envelope.

A panel prepared as described in the immediately preceding paragraph, but with the outer envelope constructed of polyethylene of 1 mil thickness, glows strongly after the tetrakis(dimethylamino)ethylene is added. The light emission continues at a much higher level than in the case of the panel made with 3.5 mil polyethylene because of the more rapid diffusion of air through the thinner polyethylene envelope. The glow becomes relatively feeble after about five hours.

Example VI

Open-end pouches about 5 inches square are prepared by heat sealing three edges of two sheets consisting of polyethylene, 2 mils thick, laminated to poly(ethylene terephthalate) film. A porous substrate consisting of 0.53 g. of nonwoven poly(ethylene terephthalate) fabric is placed in the pouch and then 0.47 g. of glass fiber is inserted uniformly between the porous substrate and the outer envelope to serve as a spacer between the substrate and the outer envelope. The pouch is sealed, and air in it is replaced with nitrogen by evacuating and adding nitrogen with the aid of a hypodermic needle. Approximately 4 ml. of tetrakis(dimethylamino)ethylene is then added by means of a hypodermic needle, and the hole left by the needle is closed by means of tape. After several hours, the envelope is opened by removing the tape over the hole and the panel is worked by hand to introduce air. The substrate glows with a bright, blue-white light. The glow is brightest where the glass fibers hold the outer envelope away from the substrate. After one hour, there still remains light around the hole over one-half of the area. The panel is again worked by hand. After another hour, the light emission is similar to that of the preceding hour. The hole in the bag is resealed and the light emission soon ceases.

Example VII

Three panels are prepared as described in Example II using 5" x 5" pieces of glass fibed paper weighing about 1.2 g. each as the porous substrate and a poly (ethylene terephthalate)/polyethylene laminated film as the outer envelope. The substrates are impregnated under nitrogen with about 3.5 ml., respectively, of tetrakis(dimethylamino)ethylene, a 50%, by volume, solution of tetrakis(dimethylamino)ethylene in mineral oil, and a composition made up of 100 ml. of tetrakis(dimethylamino)ethylene, 100 ml. of technical decane, 5 ml. of adiponitrile, and 2 g. of high molecular weight polyisobutylene. When air is admitted to the panels and the light emitted is measured with a photometer, the brightness of the panels is found to be 2.8, 4.4, and 1.9 foot lamberts, respectively.

Example VIII

A panel is prepared in the usual way using glass fiber paper as the porous substrate and poly(ethylene terephthalate)/polyethylene laminated film as the envelope. To prevent the film from adhering to the impregnated substrate, a layer of polypropylene netting is placed on the topside of the glass fiber paper before sealing in the envelope. The porous paper (0.9 g., 4.2" x 5") is impregnated under nitrogen with 4.4 ml. of a 50%, by volume, solution of tetrakis(dimethylamino)ethylene in mineral oil. Air is admitted to the panel at a controlled rate of 2 ml. per minute while the light emission from the panel is measured at a distance of about 3" with a highly sensitive photographic exposure meter. The following meter readings are observed:

| Time: | Meter Reading |
|---|---|
| 0 min. | 7.5 |
| 15 min. | 8.2 |
| 30 min. | 8.0 |
| 60 min. | 6.5 |
| 2 hrs. | 4.7 |

Example IX

Two panels are prepared and tested as in Example VIII except that nylon netting is used as the spacer between the porous layer and the envelope, and a layer of aluminum foil is cemented to the back of one of the panels. Air is admitted and the light emission is measured with a photographic exposure meter in which the clear window of the meter is fitted with colored glass filters (Corning filters Nos. 375 and 468) so that the meter has the same spectral sensitivity as the dark-adapted eye. In addition, the modified meter is calibrated so that the brightness of the panels can be measured in food lamberts.

BRIGHTNESS, IN FOOT LAMBERTS

| | Time | | | | |
|---|---|---|---|---|---|
| | 5 Min. | 15 Min. | 30 Min. | 1 Hr. | 2 Hrs. |
| Regular Panel | 0.51 | 0.51 | 0.39 | 0.28 | 0.11 |
| Aluminum Foil-backed Panel | 0.85 | 1.3 | 1.25 | 0.62 | 0.20 |

These results show the effectiveness of the aluminum foil backing in increasing the front light emission of the tetrakis(dimethylamino)ethylene-impregnated panel.

Example X

An aluminum foil-backed panel four feet square is prepared as described in Example IX with the exception that two ports of polyethylene tubing flanged at the bottom are heat sealed in to the top layer of the envelope of poly(ethylene terephthalate)/polyethylene laminate near two opposing corners. These ports are used for flushing the panel with nitrogen and for adding 450 ml. of a 50%, by volume, solution of tetrakis(dimethylamino) ethylene in mineral oil. The panel is attached to a frame and held in a vertical position about six feet off the ground on a relatively clear night (but with the moon obscured by clouds) at 30° F. Air is introduced by mouth to the panel and observers two miles away are able to see the panel easily, due to the luminescence of the impregnated layer. There is no difficulty in reading printed matter at a distance of 15 feet by means of the light emitted from the panel. After one hour, during which no further air is introduced, the panel is still visible to the observers two miles away.

Example XI

A panel is prepared as in Example X with the exception that the clear plastic envelope is prepared from transparent, oriented poly(vinyl fluoride) film 2 mils thick and no aluminum foil is attached to the back. The panel is rolled up and sealed under nitrogen in a glass tube. The tube containing the panel is then stored in a room with natural and artificial illumination. After storage for eight months, the tube is opened, aluminum foil is applied to the back of the panel, air is admitted, and the light emission from the panel is measured. Only a single charge of air is introduced at the start of the test. The following results are obtained with the photographic exposure meter as modified with colored filters (Example IX):

BRIGHTNESS OF PANELS AFTER EIGHT MONTHS' STORAGE

| Time, minutes: | Brightness, in foot lamberts |
|---|---|
| 5 | 2.2 |
| 15 | 0.85 |
| 30 | 0.11 |

These results show the good stability of the panel to long-term storage.

and light is again emitted when the valves are open for a short time.

When the procedure of Example XX is repeated with the exception that the same ethylene/ethyl acrylate copolymer tubing is used without any coatings, the tubing is seen to glow dully when observed in a dark room. Thus, the uncoated ethylene/ethyl acrylate tubing is permeable to air to some extent.

*Example XXI*

A 3″ length of 1/8″ inside diameter x 5/8″ outside diameter polypropylene tubing is flushed with nitrogen and then one-half filled with the tetrakis(dimethylamino)-ethylene/mineral oil solution of Example XVIII and the ends are closed with serum stoppers. When observed in a dark room, the tubing glows at a low level because of slow diffusion of air through the walls of the tubing. After six weeks, a little air is injected into the tubing and considerable light emission is observed in a darkened area.

In addition to the various embodiments already mentioned in the examples and in the general discussion of modifications and equivalents, the oxyluminescent articles of this invention can also include still other modifications. For example, the shape of the panels can be varied from the flat, rectangular panels described in detail above to narrow ribbon-like panels, and to panels of various shapes, such as domes, pyramids, and the like. These various shapes can be achieved during inflation of the panel with air or oxygen or by means of ribs, staves, or air-inflatable channels built into the panels.

In another embodiment, the articles can be constructed dry, i.e., without the active oxyluminescent material being impregnated in the porous substrate, and the panels or tubes fitted with pressurized containers filled with the active oxyluminescent composition for discharge into the inside of the article when desired.

In still another embodiment, the articles can be fitted with pressurized containers filled with air or oxygen or a mixture of oxygen with a gas that is inert to the oxyluminescent material for discharge into the center of the article when light emission is desired.

The valve for admitting air or oxygen to the inside of the article can, if desired, be fitted with a chamber containing a drying agent, e.g., anhydrous calcium chloride, so that the air or other gas admitted to the interior will be dry. This embodiment is advantageous when the oxyluminescent material is decomposed or sensitized by moisture.

In addition to the incorporation of oils, waxes, and various organic and inorganic thickening agents to control the viscosity of the oxyluminescent material as described previously, the oxyluminescent material can also be compounded with colorants of various types, e.g., dyes and pigments, to modify the color of the light emitted by the article. A colored filter, e.g., a dyed or pigmented film, can also be used to modify the color of the emitted light.

In still another embodiment, the articles of this invention can be fitted with containers of a quenching agent for discharge into the panel or tube when it is desired to stop the light emission. Examples of suitable quenching agents for this use include acetone, cyclohexanone, tetrachloroethylene, nitrobenzene, and the like.

As indicated previously, the extended light sources of this invention are useful in many applications. More particularly, the oxyluminescent panels and tubes are highly suitable for use in rescuing crew members and passengers of aircraft which have been downed in remote uninhabitated places on land or sea. The tubular light sources and narrow ribbon-like panels are especially suitable for the emergency lighting of life rafts, life vests, aircraft escape slides, aircraft instrument panels, and other locations in the interior of aircraft. The flexibility of the tubing and ribbon enables emergency equipment to which they are attached to be folded up for storage until needed in emergencies. The oxyluminescent articles carried by the aircraft in an inactive state can be activated rapidly when needed to signal rescuers at night.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. An oxyluminescent article comprising a plastic enclosure containing a porous substrate impregnated with a tetrakis(disubstituted-amino)ethylene oxyluminescent material, said enclosure being provided with means for admitting air in controllable amounts, and being further characterized by having at least one area which permits the passage of light.

2. An oxyluminescent article comprising a sheet-like porous substrate impregnated with a tetrakis(disubstituted-amino)ethylene oxyluminescent material enclosed in a flexible plastic envelope, at least one portion of which permits the passage of light through it, said envelope being fitted with at least one means for admitting air in controllable amounts to the oxyluminescent material.

3. An oxyluminescent article comprising a rope-like porous substrate impregnated with a tetrakis(disubstituted-amino)ethylene oxyluminescent material enclosed in a plastic tube, at least one portion of which permits the passage of light through it, said tube being fitted with at least one means for admitting air in controllable amounts to the oxyluminescent material.

4. An article of claim 1 where the enclosure is a tough plastic having low oxygen permeability and high resistance to the oxyluminescent material and its oxidation products.

5. Articles of claim 1 where the porous substrate is provided with a coarse, open-mesh, net-like structure to prevent intimate contact with the enclosure.

6. Articles of claim 2 wherein the side of the plastic envelope opposite the translucent or transparent area is provided with a light-reflective layer.

7. Articles of claim 3 wherein the tube is provided with a light reflector whose cross section is flat, hemicylindrical or parabolic.

8. Articles of claim 1 where the oxyluminescent material is a tetrakis(disubstituted-amino)ethylene of the formula $$(R_2N)_2C=C(NR_2)_2$$

wherein the R's, which need not be the same, are selected from the group consisting of monovalent alkyl of up to 10 carbons, monovalent cycloalkyl of up to 10 carbons, divalent alkylene joined to the other R attached to the same nitrogen to form a 3–5 membered monoaza heterocycle, and divalent alkylene joined to an R attached to a second nitrogen to form a 3–7 membered diaza heterocycle.

9. Articles of claim 1 wherein the oxyluminescent material is in an inert carrier.

10. Articles of claim 1 in the form of panels in which the backs are coated with a pressure-sensitive adhesive.

11. Articles of claim 1 in which the porous substrate is colored.

12. An oxyluminescent panel comprising a porous substrate of glass fiber paper impregnated with tetrakis(dimethylamino)ethylene enclosed in a transparent envelope of polyethylene terephthalate/polyethylene laminated film, said substrate being kept out of intimate contact with the enclosing envelope by means of a spacer of nylon netting, said envelope being fitted with a port for controlled admission of air and having attached to the outside of one side a light-reflective layer of aluminum foil.

13. An oxyluminescent panel comprising a porous substrate of nonwoven polyethylene terephthalate fabric

Example XII

A panel is prepared in the usual way using glass fiber paper as the porous substrate, nylon netting as the spacer, poly(vinyl fluoride) film as the envelope, and aluminum foil backing. The panel is flushed with nitrogen and the porous layer is impregnated with 4 ml. per square decimeter of a composition comprising 15 volumes of mineral oil and 9 volumes of 1,1′,3,3′-tetraethyl-$\Delta^{2,2'}$-bi(imidazolidine). Air is admitted to the panel and light emission is observed. A brightness of 0.1 foot lambert is indicated by a sensitive photographic exposure meter within 15 seconds after the air is admitted.

Example XIII

Two panels are prepared as in Example XII except that in one case a layer of poly(ethylene terephthalate) cloth dyed red with a dye (Colour Index No. C. I. Basic Red 15) is placed between the glass fiber paper and the nylon net and in the other case three layers of the dyed fabric are substiuted for the glass paper. The panels are flushed with nitrogen and the substrates are impregnated with 4 ml. per square decimeter of a 37%, by volume, solution of tetrakis(dimethylamino)ethylene in mineral oil. When air is admitted, the panels emit red light instead of the blue-green light seen in the panels described in Examples I–XII. A brightness of at least 0.2 foot lambert is recorded by a sensitive photographic exposure meter.

Example XIV

Two panels are prepared as in Example XIII except that the porous substrates are pigmented polypropylene felts. The felts are impregnated with dispersions of fluorescent pigment, prepared by encasing fluorescent dyes in an insoluble polymeric matrix and grinding, in aqueous polyvinyl alcohol solution. For one panel the fluorescent pigment is one known commercially as "Day Glo" Fluorescent Pigment Saturn Yellow T17, and for the other it is Fire Orange T14. The panels are flushed with nitrogen and the felts are impregnated with 6.7 ml. per square decimeter of a 37%, by volume, solution of tetrakis(dimethylamino)ethylene in mineral oil. Air is admitted and the panels are seen to emit yellow and red light, respectively. The brightness of the yellow panel five minutes after the air is admitted is 5 foot lamberts and that of the red panel is 0.9 foot lambert.

Example XV

A panel is prepared as described in Example IV with the exception that the porous susbtrate is a sheet of alkali cellulose. When air is admitted the panel glows quite strongly. However, the brown discoloration usually noted during prolonged oxidation and light emission is absent, due to presence of the alkali in the alkali cellulose porous substrate.

The beneficial effect of alkali in enhancing the oxyluminescence of tetrakis(disubstituted-amino)ethylene compositions and in preventing discoloration of such compositions as demonstrated by Example XV is also supported by the following observations: (1) When a layer of tetrakis(dimethylamino)ethylene is exposed to air while floating on aqueous solutions containing 8% borax, 10% sodium borohydride (which soon decomposes to sodium borate and hydrogen), 15% potassium hydroxide, 10% disodium dodecahydrododecaborate$^{2-}$, and 5% disodium dodecahydrododecaborate$^{2-}$+5% sodium peroxide (which decomposes to sodium hydroxide and oxygen), 1.5, 2.5, 3.0, 3.5, and 5.3 times, respectively, as much light is generated as when a layer of the peraminoethylene is exposed to air on water alone. (2) Furthermore, tetrakis(dimethylamino)ethylene in contact with water or alcohol, especially in the presence of a little air, produces a deep yellow or brown discoloration in the water or alcohol and also produces free radicals as indicated by electron paramagnetic resonance measurements; whereas this peraminoethylene in contact with alkali solutions produces neither color nor an electron paramagnetic resonance signal.

Example XVI

An approximately one-foot length of ¼″ nominal diameter polyvinyl alcohol tubing is partially filled with an 11″ length of untreated electrical grade ¼″, nominal flat width, glass cloth sleeving. The partly filled tubing is flushed with nitrogen and the ends are closed with serum stoppers. By means of a hypodermic syringe and needle, sufficient tetrakis(dimethylamino)ethylene is injected to saturate the glass cloth. Three hours later no light emission from the tubing can be detected in a dark room, even after five minutes of dark adaptation. However, when a little air is injected into the tubing, considerable light is emitted and the whole tube glows. After standing one month, the tube glows anew when additional air is injected.

Example XVII

Another polyvinyl alcohol tube is prepared as in Example XVI except that the glass cloth is saturated with a 37%, by volume, solution of the peraminoethylene in mineral oil. When air is injected into the tubing, the tube glows and may be seen easily from a distance of 75 feet in a semidark residential area.

Example XVIII

An approximately one-foot length of tubing made of a copolymer of tetrafluoroethylene and hexafluoropropylene having ⁹⁄₁₆″ inside diameter and 25 mil wall thickness is loaded with glass cloth as in Example XVI and the cloth is saturated under nitrogen with a 20/34 (volume/volume) solution of tetrakis(dimethylamino)ethylene/mineral oil. After standing for one day, the tubing can be seen to be glowing slightly when examined in a dark room. This slight glow is due to slow permeation of air through the wall of the tubing. The tubing glows strongly when air is injected into it.

Example XIX

A 3″ length of ⅜″ outside diameter, 32 mil wall thickness nylon tubing is loaded with glass cloth as in Example XVI and the cloth is saturated under nitrogen with the tetrakis(dimethylamino)ethylene/mineral oil solution of Example XVIII. After standing for two days, the tubing and its contents appear unchanged. In a dark room the tubing exhibits a very dull glow, indicating a very slow but finite permeation of air through the tubing wall. A bright emission of light is seen when air is injected into the tubing. After standing for 19 weeks, a little air is injected and the tubing is seen to emit considerable light.

Example XX

A 30″ length of ⅜″ inside diameter, ½″ outside diameter ethylene/ethyl acrylate copolymer tubing is dipped in succession into 1, 1, and 15% methyl ethyl ketone solutions, respectively, of (a) tetraisopropyl titanate, (b) a terpolymer of 86% vinyl chloride, 11% vinyl acetate, and 3% maleic anhydride, and (c) a copolymer of 60% vinylidene chloride and 40% vinyl chloride. After each dip, the tubing is allowed to dry and is baked five minutes at 82° C. The tubing is filled with six 26″ lengths of ½″ wide electrical grade glass cloth sleeving having no finish and weighing 11 g. The tubing is flushed with nitrogen, the glass cloth is saturated with 11 ml. of the tetrakis(dimethylamino)ethylene/mineral oil solution of Example XVIII and ends are closed with metal valves. Essentially no light emission is observed when the tubing is exposed in a dark room. When the valves are opened for a short time and air is admitted or deliberately forced into and through the tubing, the tubing glows and emits light for some time. This process can be repeated many times. After standing five weeks, the tubing still has the light yellow appearance that it had when first prepared impregnated with tetrakis(dimethylamino)ethylene enclosed in a transparent envelope of poly(vinyl fluoride) film, said substrate being kept out of intimate contact with the enclosing envelope by means of a spacer of polypropylene netting, said envelope being fitted with a port for controlled admission of air and having attached to the outside of one side a light-reflective layer of aluminum foil.

14. An oxyluminescent tube comprising a porous substrate of glass cloth sleeving impregnated with tetrakis(dimethylamino)ethylene enclosed in a tube of polyvinyl alcohol, said tube being fitted with means for controlled admission of air.

15. An oxyluminescent tube comprising a porous substrate of glass cloth sleeving impregnated with tetrakis(dimethylamino)ethylene enclosed in a tube of a copolymer of tetrafluoroethylene and hexafluoropropylene, said tube being fitted with means for controlled admission of air.

16. Process for preparing oxyluminescent panel-type articles which comprises placing a layer of a porous substrate that is inert to tetrakis(disubstituted-amino)ethylenes between two sheets of flexible plastic, at least one of which permits passage of light through it, of a size larger than said substrate, inserting through an opening made near the edge of one sheet means for permitting access to the envelope formed by sealing the edges of the plastic sheets, sealing said edges, replacing the air in the interior of the envelope with an inert gas, and introducing a tetrakis(disubstituted-amino)ethylene as the oxyluminescent material via said means into the interior of the envelope, thereby completing impregnation of the porous substrate with the oxyluminescent material under substantially oxygen-free conditions.

17. Process for preparing oxyluminescent tubular articles which comprises passing a cord through a length of plastic tubing, at least a portion of said tubing being such as to permit passage of light through it, attaching one end of the cord to the end of a sleeving of a porous substrate that is inert to tetrakis(disubstituted-amino)ethylenes, pulling the porous substrate into the tube, the cross secional area of the substrate being such that it does not completely fill the tube, closing the ends of the tube, inserting means for permitting access to the inner portion of the tube, replacing the air in the inner portion of the tube with an inert gas, and introducing a tetrakis(disubstituted-amino)ethylene as the oxyluminescent material via said means into the inner portion of the tube, thereby completing impregnation of the porous substrate with the oxyluminescent material under substantially oxygen-free conditions.

18. In the process of claim 16, the step of inserting a coarse, open-mesh structure between the porous substrate and the plastic sheet which permits the passage of light, said structure serving as a spacer to prevent the substrate when wet with oxyluminescent material from adhering to the outer plastic sheet.

References Cited
UNITED STATES PATENTS

| | | |
|---|---|---|
| 2,750,027 | 6/1956 | Cummings. |
| 3,110,836 | 11/1963 | Blazek et al. |
| 3,239,406 | 3/1966 | Coffman et al. _____ 250—71 X |

L. DEWAYNE RUTLEDGE, *Primary Examiner.*